4 Sheets—Sheet 1.

G. C. GILL.
Apparatus for Stopping and Reversing Machinery.

No. 216,787. Patented June 24, 1879.

Witnesses
G. M. Graham,
John Boleschka.

Inventor.
George C. Gill
by Munson & Philipp
Attys.

4 Sheets—Sheet 2.

G. C. GILL.
Apparatus for Stopping and Reversing Machinery.
No. 216,787. Patented June 24, 1879.

Witnesses
Geo. M. Graham
John Boleschka

Inventor.
George C. Gill
by Munson & Philipp
Attys.

G. C. GILL.
Apparatus for Stopping and Reversing Machinery.

No. 216,787. Patented June 24, 1879.

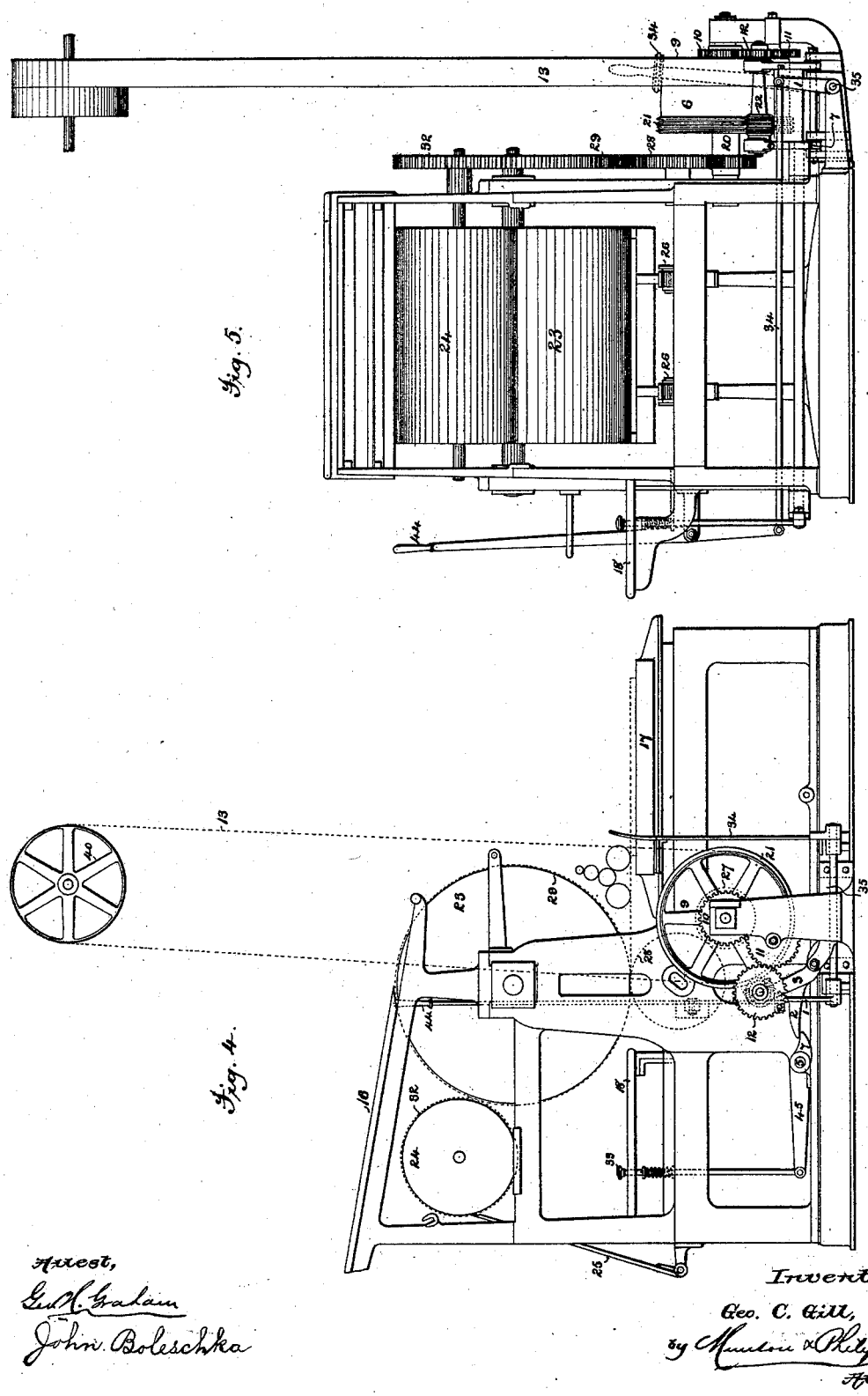

UNITED STATES PATENT OFFICE.

GEORGE C. GILL, OF BROOKLYN, ASSIGNOR TO R. HOE & CO., OF NEW YORK, N. Y.

IMPROVEMENT IN APPARATUS FOR STOPPING AND REVERSING MACHINERY.

Specification forming part of Letters Patent No. 216,787, dated June 24, 1879; application filed May 1, 1879.

*To all whom it may concern:*

Be it known that I, GEORGE C. GILL, of the city of Brooklyn, county of Kings, and State of New York, have invented a new and useful Improvement in Apparatus for Stopping and Reversing Machinery; and I do hereby declare the following specification, when taken in connection with the accompanying drawings, to be such a full, clear, and exact description of the same as will enable others skilled in the art to make and use the same.

The invention consists in novel combinations of mechanisms whereby the rotative movement of machines may be quickly arrested, and, if desired, reversed, all of which is too particularly hereinafter described to need further preliminary description.

Figure 1:
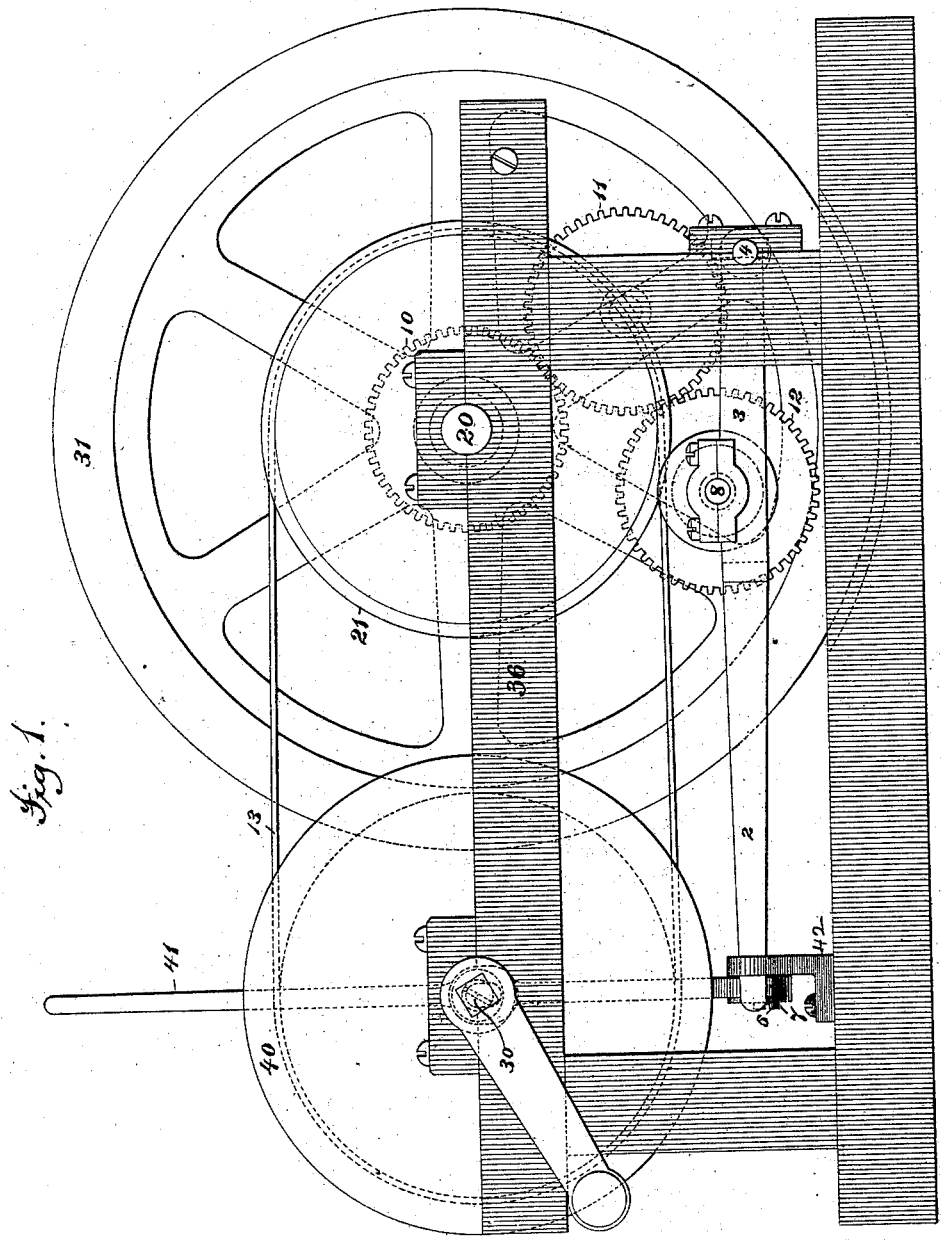
Figure 2:
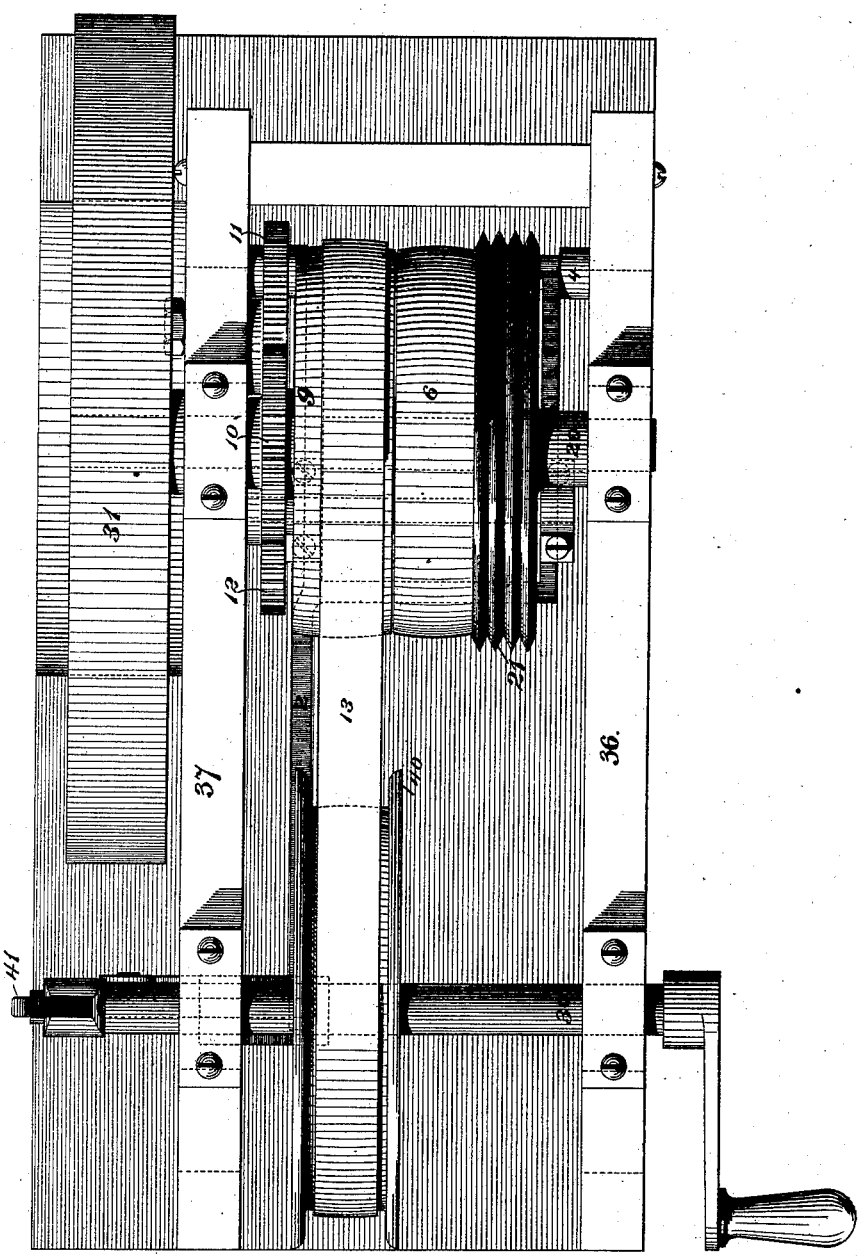
Figure 3:
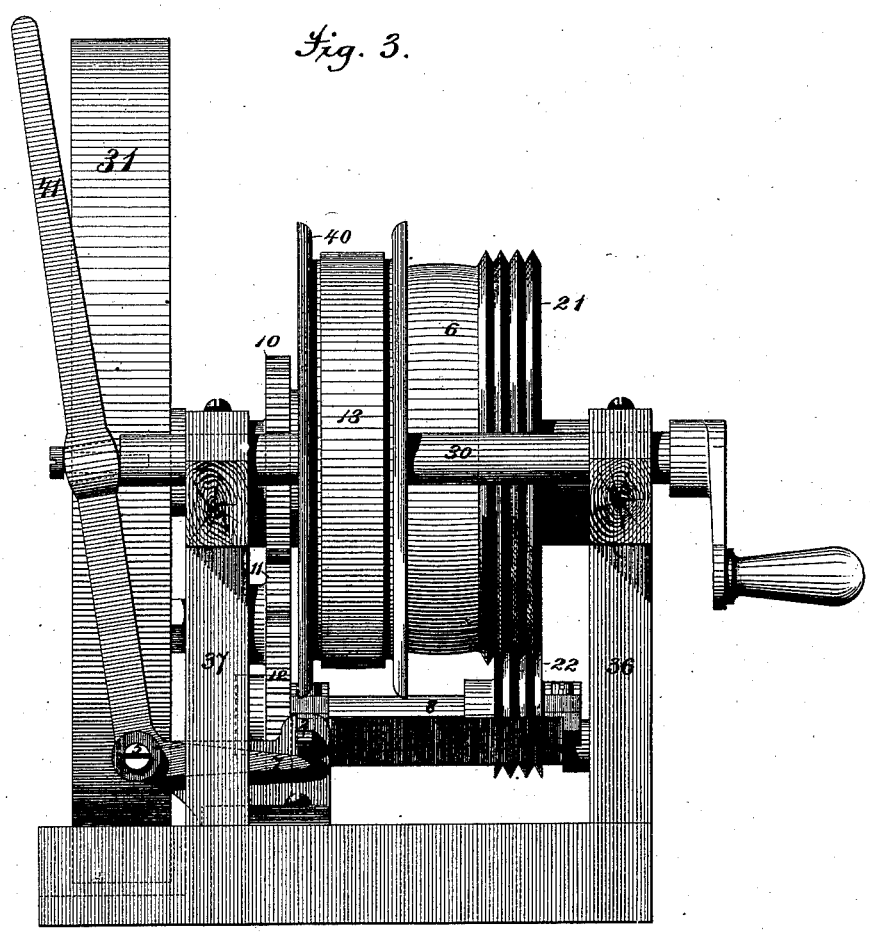

To facilitate an understanding of said invention, I have shown in Sheets 1, 2, and 3 of the accompanying drawings a simple structure embodying it, said drawings illustrating the same by a side elevation in Figure 1, a plan view in Fig. 2, and an end view in Fig. 3, and will now proceed to fully set forth the structure and operation of the mechanisms illustrated.

The driving-shaft 20 (which may constitute the driving-shaft of any machine) is hung so as to turn freely in proper bearings in the side frames 36 37, while the main or counter shaft, from which the shaft 20 is to receive its motion through the belt 13, is represented by the shaft 30, which, for the purpose of easy illustration, is here shown in close proximity to said shaft 20, and as running in bearings also in the side frames.

The shaft 30, which carries a belt-pulley, 40, in this case, for the purpose of convenient illustration, is shown as mounted so as to slide endwise in its bearings, and as provided with a shifting-lever, 41, for imparting to it said endwise movements. This shifting-lever 41 is shown as a bell-crank, the long arm of which embraces one end of the shaft 30, and is pivoted at 5 to a bracket, 42, properly secured in a suitable position.

The driving-shaft 20 is provided with a fast pulley, 6, and a loose pulley, 9, which loose pulley is of extra width on its face, for a purpose that will be presently explained, with which said pulleys a driving-belt, as 13, from the pulley 40 co-operates in the usual manner to drive either, as may be desired. These fast and loose pulleys are connected together by a novel system of gearing, as follows: The loose pulley has a gear-wheel, 10, secured to its outer side, which, through the intermediate wheel 11, (turning on a stud projecting from the frame,) drives the gear-wheel 12, fixed on the outer end of the shaft 8. This shaft runs in a vibrating frame, 3, and has near its opposite end a small grooved wheel, 22, which can be brought in contact with a larger grooved wheel, 21, formed on the outer edge of the fast pulley 6, or it may be a separate wheel secured to the side of the pulley or to the shaft 20, and these grooved wheels 21 22 will form a species of frictional gearing when brought into contact with each other.

The vibrating frame 3 is hung at its rear end by a shaft or studs, as 4, having bearings in the frame-work or brackets extending therefrom, and has a long arm, 2, extending outward from its front end at a suitable point to be engaged by the short arm 7 of the bell-crank lever 41, as is best seen in Figs. 1 and 2.

A fly-wheel, 31, is attached to one end of the driving-shaft 20, and, as here shown and applied, is for the purpose of furnishing a certain amount of momentum and inertia to be overcome, in order to illustrate more plainly the manner in which the momentum and inertia of the machine to which this invention may be applied will in practice be overcome. This arrangement of parts is such that when the shifting-lever has been moved to carry the belt-pulley 40 into a position to guide the belt 13 onto the fast or driving pulley 6, the vibrating frame 3 will by its own gravity be depressed to its lowest position, which will drop the grooved wheel 22 out of contact with the grooved wheel 21, whereupon the ordinary operation of driving one shaft from another by a belt passing over pulleys fast upon each will be carried on. When, however, the shifting-lever 41 is so moved as to carry the belt-pulley 40 into a position to guide the driving-belt 13 onto the loose pulley 9, and cause its short arm 7 to engage the long arm 2 and raise the vibrating frame 3 far enough to carry the grooved wheel 22 nearly into contact with the grooved wheel 21, the mechanism will then stop slowly from the friction of its parts.

If it be desired to stop the mechanism quickly, the shifting-lever is moved still farther, and the following operation will be effected: The rotative motion imparted by the driving-belt to the loose pulley 9 and to the gear-wheel 10, secured thereto, will be transmitted through the gear-wheels 11 and 12 to the grooved wheel 22, and thence, by its frictional contact with the grooved wheel 21, to the fast pulley 6 and to the driving-shaft 20, and the rotative motion thus given to the driving-shaft 20 will be in a contrary direction to that imparted directly to it by the belt 13, so that the movement of this shaft 20 will thus be speedily checked and stopped.

If it be desired to reverse the motion of the shaft 20, a continued pressure on the shifting-lever and frictional gearing after the shaft 20 has been stopped will cause it to turn in the opposite direction, and at a speed in accordance to the proportions to each other of the diameters of the gear-wheels 10 and 12, and also of the grooved wheels 21 and 22.

By these mechanisms the driving-shaft 20 may be revolved at high speed when the belt is running over the fast pulley; and said motion may be not only stopped, but reversed, when the said belt is running over the loose pulley, since the motion which the grooved wheel 22 then has in a direction contrary to that in which the fast pulley has been driven will, in connection with the frictional pressure of said wheel 22, act as a brake to arrest its onward movement, and when that has been overcome constitute a driver to impel said fast pulley in the contrary direction.

It will be obvious that the grooved wheels 21 22 may be plain friction-wheels with suitably-prepared surfaces; but the grooved form is a desirable and practical one.

The belt-pulley 40 may be a part of the machine to which the apparatus is applied, in which case its shaft will, of course, be driven from the usual line-shafting; but the driving-belt 13 may come from a pulley on line or counter shafting, as is common, and the belt-shipping lever be provided with an arm, as 7, so that when the said belt 13 is carried onto the fast pulley the vibrating frame may remain in its lowest position; and when said belt is carried onto the loose pulley sufficiently far said vibrating frame will be raised, so as to press the wheel 22 into contact with the wheel 21.

It has sometimes been found very advantageous to have the mechanism which shifts the belt 13 to stop the machine and that which brings the grooved friction-wheels 21 22 into working contact entirely independent of each other. In that case the shaft represented by 30 would be a main or counter shaft, placed in any convenient position, say, attached to the ceiling overhead, and the pulley 40 secured on it will have a breadth of face equal to the combined width of the fast and loose pulleys 6 and 9, and the driving-belt 13 will be moved back and forth on these pulleys to stop and start the mechanism by the attendant through a handle-lever connected to any ordinary style of belt-shipper, and then, when desired, the grooved friction-wheels may be brought into working contact by means of a foot-treadle, so connected to the long arm 2 of the vibrating frame 3 as to raise it the proper distance. This arrangement is very convenient, because it enables a great pressure to be applied to the friction-wheels with but slight exertion, and the weight of the vibrating frame, aided by a spring, if necessary, will separate the friction-wheels when the foot is removed from the treadle.

Such a construction and application of my apparatus is shown in Sheet 4 of the accompanying drawings, which illustrate in Fig. 4 by a side elevation, and in Fig. 5 by an end view, my improved apparatus as applied to the well-known cylinder printing-machine.

In practically applying this invention it will, however, be apparent that it may be advantageously used in connection with any machine by simply connecting it with the driving-shaft, as 20, of such machine, whether the same is provided with a fly-wheel, as 31, or not.

This improved apparatus is more particularly designed to be applied to a cylinder printing-machine, which, as is well understood, it is often necessary to quickly stop the movements of, and frequently to reverse the direction of movement of its mechanisms, in order to "back up," as it is technically called, for purposes yet to be explained.

In order to a perfect understanding of this application of my apparatus, a brief description of the well-known cylinder printing-machine, as herein illustrated, will first be given.

Such a machine consists, essentially, of a rotating impression-cylinder, 23, furnished with gripers, which seize a sheet advanced to a proper position on the feeding-table 16, and carry the same upon its surface around with it in its circular movement, thus pressing the sheet into contact with a printing-form supported upon a traveling bed, 17, that is horizontally reciprocated underneath said cylinder. The printed sheet is released by the gripers and stripped from the surface of said cylinder by tapes or other suitable means, such as the delivering-cylinder 24 shown, to gripers carried by which the sheet is directed, and by them released so as to be carried down before a fly-frame, as 25, whereby it is laid upon a pile-table.

The type-bed is usually a heavy casting traveling upon rails, as 26 26, and arrested at each end of its stroke by buffers or springs.

In this machine the shaft 20 is shown to be the driving-shaft, and its motion is transmitted to the mechanisms by a toothed wheel, 27, fast upon its inner end, which engages a toothed wheel, 28, the latter meshing with the cylinder-wheel 29, which, in turn, drives the wheel 32 on the shaft of the delivering-cylinder 24.

The bed is driven by a mangle motion, (not shown,) a part of which is constituted by the shaft of the wheel 28. As here applied, the belt 13 runs from the pulley 40 on the line-shaft above the machine, its shipper 34 being fast to a rock-shaft, 35, that is moved by a rock-arm, 1, and a connecting-rod, 34, from a controlling-lever, 44.

The movements of the vibrating frame 3 are independently controlled by means of a treadle, 33, which, through the lever 41 and its pivotal shaft 5, vibrates the arm 7 to raise the lever 2 as desired.

The printing-machine is illustrated as at rest, and as the belt 13 is on the loose pulley 9, the gearing 10 11 12 and grooved wheel 22 will be in motion; but the latter, not being pressed into driving-contact with the grooved wheel 21, will not move the fast pulley 6 and shaft 20.

The feeder, who stands upon the platform 18, may now push in the lever 44, to shift the belt 13 onto the fast pulley 6 to start and drive the machine, or he may by pressure upon the treadle 33 press the frame 3 upward, and force the grooved wheel 22 into frictional contact with the wheel 21, to slowly drive the machine in a reverse direction. If, then, the feeder, who, standing upon the platform 18, is in a position to lay the sheets in a proper place on the feeding-table 16 to be taken by the fingers of the impression-cylinder 23 as the machine is running, desires to stop its movement, he may do so by moving the shipping-lever sufficiently far to throw the belt 13 onto the loose pulley; but if he fails to properly feed a sheet he may stop the machine quickly, so as to prevent the cylinder moving into contact with the inked form and become soiled thereby, by such a movement of the treadle 33 as will carry the lever 2 and raise the vibrating frame 3 so as to press the grooved wheel 22 into contact with the grooved wheel 21, whereupon the motion of the driving-shaft will be checked and stopped. If this pressure be continued it will cause a retrograde or reverse motion to be imparted to the driving-shaft 20, whereby the cylinder 23 may be backed up so that its fingers shall be in a position to take the sheet. Thus the feeder of such a machine can stop its movement as quickly as is desired. He can back up to return the cylinder to its position for receiving a sheet, if the same has stopped in too advanced a position; or if stopped with the type-bed too near the end of its stroke, he can back up to gain the proper momentum to carry it forward over the springs, or for any other purpose.

The operator of a machine supplied with this apparatus may thus start, stop, and reverse its movements by the operation of a single lever and without leaving his working position.

Instead of the starting and stopping mechanism for the apparatus consisting of the fast and loose pulleys, the old and well-known sliding-jaw clutch, or any of the many kinds of friction-clutches, may be used. In such cases there will be but one belt-pulley, and it will run loose on the shaft 20, and have the gear-wheel 10 fixed to the side of it, as in the present case, and this pulley will then become a clutch-pulley. The companion member of the clutch will be fitted to slide freely on the shaft 20, but be prevented from turning around on it by a feather fitted partly into the shaft and partly into the clutch, as is common; and to start and stop the mechanism the clutch will be slid into and out of working contact with the clutch on the loose pulley by means of a lever suitably placed. The grooved friction-pulley will be keyed fast to the shaft 20, and when the clutch is drawn out of working contact with the pulley a still further motion of the lever will raise the vibrating frame and bring the grooved friction-wheels into operation, as has been explained. The shaft 20 may have motion imparted to it by toothed or frictional gearing; and the shaft 8, with its grooved friction wheel 22, may be journaled in a sliding frame or in slots in a fixed bracket, and may be forced up to duty by a spring; all of which changes are but modifications of my invention.

What is claimed is—

1. The combination, with the starting and stopping mechanism of the driving-shaft 20, of the gear-wheels 10 11 12 and friction-wheels 21 22, substantially as described.

2. The combination, with the belt 13, the driving-shaft, and its fast and loose pulleys, of the vibrating frame carrying a frictionally-acting wheel, and gearing connecting the shaft of said wheel with the loose pulley, substantially as described.

3. The combination, with the belt 13 and a device for shifting the same, of the driving-shaft 20, fast and loose pulleys, and a vibrating frame carrying a wheel, as 22, the shaft of which is geared with the loose pulley, all substantially as described.

4. The combination, with the shaft 20, fast and loose pulleys supported thereby, the vibrating frame 3, frictionally-acting wheel 22, and gearing connecting its shaft with the loose pulley, of the belt 13, its pulley 40, and the shifting-lever 41, substantially as described.

5. The combination of the shaft 20, fast and loose pulleys supported thereby, the vibrating frame 3, friction-wheels 21 22, gear-wheels 10 11 12, and actuating-belt 13, substantially as described.

In testimony whereof I have signed my name to this specification in the presence of two subscribing witnesses.

GEORGE C. GILL.

Witnesses:
CHAS. W. CARPENTER,
ALBERT S. BURLINGHAM.